Patented Oct. 10, 1944

2,360,205

UNITED STATES PATENT OFFICE 2,360,205

COMPOSITIONS OF MATTER AND METHOD OF PRODUCING

Richard F. B. Cox, Wilmington, Del., assignor to Hercules Powder Company, Wilmington, Del., a corporation of Delaware No Drawing. Application December 31, 1943, Serial No. 516,512

10 Claims. (Cl. 260—97)

This invention relates to new compositions of matter and to a method for their preparation. More particularly, it relates to halogenated lactones of resin acids and to a method for their preparation.

When resin and rosin acids known in the art are halogenated the resulting products are the corresponding halogenated resin and rosin acids. Thus, the halogenation of known dihydroabietic acids leads to the formation of the corresponding dihalo-tetrahydroabietic acids. Nowhere in the art has there ever been described a halogenation of a dihydroabietic acid which has resulted in the formation of a halolactone of hydroxytetrahydroabietic acid. Halogenated lactones of resin acids have never been shown to have been prepared in the art.

Now in accordance with this invention it has been found that when certain dihydroabietic acids, namely, one melting at 185°–186° C. of rotation $(\alpha)_D -36°$ in 2% solution in ethanol and another melting at 147°–148° C. of rotation $(\alpha)_D +68°$ in 2% solution in ethanol, are treated with a halogenating agent at a temperature from about —35° C. to about 60° C. that a new and unexpected result is obtained, namely, the formation of a halolactone of hydroxytetrahydroabietic acid instead of a corresponding dihalotetrahydroabietic acid. The halolactones of hydroxytetrahydroabietic acid which are formed by such a process are new compositions of matter.

Having now given the nature and purpose of the invention there follows a more detailed description thereof in the form of examples. All quantities refer to parts by weight, and all optical rotations were measured on a 2% solution of the material concerned in ethanol unless otherwise stated.

Example 1

To a mixture of 900 parts ethyl alcohol and 225 parts of concentrated hydrochloric acid were added 4.5 parts of dihydroabietic acid melting at 185°–186° C. with optical rotation $(\alpha)_D -36°$. Then to this solution were slowly added 135 parts of an aqueous solution containing 6.1 parts of potassium bromide and 1.1 parts of potassium bromate. On standing 4 hours at 4° C., 3 parts of crystals were obtained. These crystals were the bromolactone of hydroxytetrahydroabietic acid melting at 113°–114° C. and had a rotation $(\alpha)_D +18°$.

Example 2

Three parts of dihydroabietic acid of melting point 185°–186° C. and $(\alpha)_D -36°$ were dissolved in 450 parts of chloroform and cooled to —10° C. To this was added 1.5 parts bromine in 150 parts of chloroform at such a rate that the temperature was kept below —10° C. and gradually dropped so that the final addition was made at —35° C. After standing ½ hour, the chloroform solution was washed with water until free of hydrogen bromide. The chloroform was removed by distillation in vacuo to recover a residue which was neutral, indicating the absence of a carboxyl group. The residue was recrystallized from methanol yielding 3 parts of the bromolactone of hydroxytetrahydroabietic acid melting at 113°–114° C. and of rotation $(\alpha)_D +18°$.

Example 3

To a mixture of 800 parts of ethyl alcohol and 20 parts concentrated hydrochloric acid were added 4.7 parts of dihydroabietic acid melting at 147°–148° C. and of rotation $(\alpha)_D +68°$. Then 144.8 parts of an aqueous solution containing 6.5 parts of potassium bromide and 1.2 parts of potassium bromate were slowly added and the mixture kept at —4° C. for 24 hours to deposit crystals amounting to 1 part. Upon recrystallization from acetone these crude crystals yielded a bromolactone of hydroxytetrahydroabietic acid which melted at 100°–101° C. and had a rotation $(\alpha)_D$ of $+4°$.

Example 4

Three parts of dihydroabietic acid melting at 147°–148° C. and having a rotation $(\alpha)_D$ of $+68°$ were dissolved in 300 parts of chloroform and cooled to —20° C. at which temperature 1.5 parts of bromine in 150 parts of chloroform were slowly added. After standing ½ hour the chloroform solution was washed free of hydrogen bromide with water and then evaporated to recover 3.7 parts of residue. This residue was recrystallized from methanol to yield 3.4 parts of a bromolactone of hydroxytetrahydroabietic acid of constant melting point at 100°–101° C. and of rotation $(\alpha)_D +4°$. The final product was neutral in reaction and had a bromine content of 21.0%. The bromine content calculated for a bromolactone of hydroxytetrahydroabietic acid of formula $C_{20}H_{31}O_2Br$ is 20.83%.

The dihydroabietic acids used in this invention may be prepared by treating the lactone of hydroxytetrahydroabietic acid melting at 131°–132° C. with an organometallic compound such as a Grignard reagent. Purification may be accomplished by separating the mixture of dihydroabietic acids thus formed from the reaction product and obtaining the individual dihydroabietic acids by fractional crystallization. For example, the dihydroabietic acids may be prepared by adding gradually 30.4 parts of the lactone of hydroxytetrahydroabietic acid melting at 131°–132° C., dissolved in 100 parts of dry benzene, to 16.6 parts of methyl magnesium iodide prepared by combining 15 parts of methyl iodide with 2.3 parts of magnesium in 50 parts of ether, and, when the addition is complete, heating the mixture for 5 hours at 80°–100° C. and pouring the reaction product into 100 parts of ice water containing 25 parts of ammonium chloride. The benzene layer may then be extracted with 300 parts of 2% sodium hydroxide solution. This extract is composed of a mixture of the salts of two dihydroabietic acids, one melting at 147°–148° C. and the other at 185°–186° C. The mixture of acids may be recovered by acidification and separation from the mother liquor by filtration. The individual dihydroabietic acids may be obtained from this mixture by fractional crystallization from a solvent such as ethyl acetate or acetone. The dihydroabietic acids useful in the process of this invention may be employed in their purified states, in the form of their admixture produced as described above, or in mixtures with other materials. When the admixture of the two dihydroabietic acids is used as the starting material, two halolactones of hydroxytetrahydroabietic acid are formed by a single operation of the process, one formed from the dihydroabietic acid of melting point 147°–148° C., and the other formed from the dihydroabietic acid of melting point 185°–186° C. Although the above described method is a convenient one for the preparation of the dihydroabietic acids used as starting materials in this invention, the usefulness of these acids with regard to this invention is not dependent upon any one specific method of preparation.

Although bromine is preferred, any halogenating agent may be used such as chlorine, bromine, iodine, or fluorine. The source of halogen may be the element or a compound with another halogen such as iodine chloride, bromine chloride, iodine pentafluoride, bromine trifluoride, chlorine fluoride, etc. The halogen may also be generated in the reaction mixture by oxidation of the negative halogen ion with an oxidizing salt such as potassium bromate, sodium chlorate, lithium iodate, etc. An oxidizing material such as manganese dioxide may be used to liberate the halogen from its halide providing the oxidizing agent is not of sufficient strength to attack the dihydroabietic acids appreciably in preference to the halide. The halogen may also be generated by the electrolysis of a halide.

If the halogen is generated by a reaction in which water is required such as the reaction between an acid and a mixture of a halide and a haloate, a water miscible reaction solvent may be used such as acetic acid, a lower alcohol, dioxane, ethyl acetate, acetone, etc. If the halogen is added as a liquid or gas, a water immiscible solvent may be used such as benzene, chloroform, carbon tetrachloride, hexane, ethylenedichloride, etc. The solvent may be any one which will dissolve the reactants but not react with them to prevent the progress of the halogenation.

The temperature of the reaction may vary from about −35° C. to about 60° C., but preferably will be from about −4° C. to about 30° C. The temperature should not be so low as to freeze the solvent and prevent adequate mixing of the ingredients.

The time required for the reaction may vary from about 5 minutes to about 1 hour depending on the temperature employed, but in the preferred range of temperature about ¼ hour to about ½ hour may be used.

It is believed that in the process addition of halogen to the double bond in the dihydroabietic acid molecule occurs, followed by splitting off of hydrogen halide resulting in the formation of the corresponding halolactone. The two dihydroabietic acids useful in this invention are shown in I and II below. The corresponding halolactones of hydroxytetrahydroabietic acid produced from them are shown in III and IV where X may be any halogen.

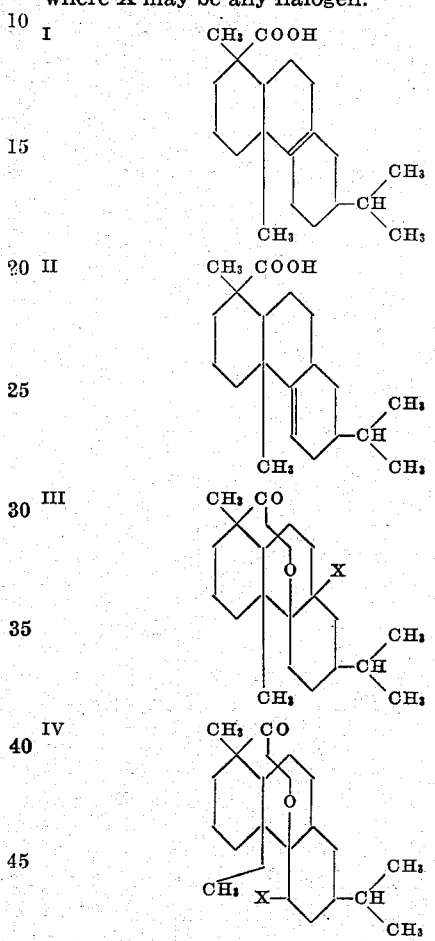

Although the bromolactones of hydroxytetrahydroabietic acid are crystalline, the corresponding chlorolactones are colorless liquids at room temperature and have a specific gravity greater than one.

The halolactones of hydroxytetrahydroabietic acid produced in accordance with the process of this invention are useful as intermediates in the synthesis of products having the hydrogenated phenanthrene nucleus.

What I claim and desire to protect by Letters Patent is:

1. A method of producing an halolactone of an hydroxytetrahydroabietic acid which comprises treating a dihydroabietic acid, selected from the group consisting of the dihydroabietic acid melting at 185°–186° C. and of rotation $(\alpha)_D -36°$, and the dihydroabietic acid melting at 147°–148° C. and of rotation $(\alpha)_D +68°$, with an halogenating agent at a temperature between about −35° C. and about 60° C.

2. A method of producing an halolactone of an hydroxytetrahydroabietic acid which comprises treating a dihydroabietic acid, selected from the group consisting of the dihydroabietic acid melting at 185°–186° C. and of rotation $(\alpha)_D -36°$ and the dihydroabetic acid melting at 147°–148°

C. and of rotation $(a)_D+68°$, with an halogenating agent at a temperature between about $-4°$ C. and about 30° C.

3. A method of producing an halolactone of an hydroxytetrahydroabietic acid which comprises treating a dihydroabietic acid, selected from the group consisting of the dihydroabietic acid melting at 185°–186° C. of rotation $(a)_D-36°$, and the dihydroabietic acid melting at 147°–148° C. of rotation $(a)_D+68°$ with an halogen at a temperature between about $-35°$ C. and about 60° C.

4. A method of producing an halolactone of an hydroxytetrahydroabietic acid which comprises treating a dihydroabietic acid, selected from the group consisting of the dihydroabietic acid melting at 185°–186° C. of rotation $(a)_D-36°$ C., and the dihydroabietic acid melting at 147°–148° C. of rotation $(a)_D+68°$, with an acid solution of an halide and haloate at a temperature between about $-35°$ C. and about 60° C.

5. A method for producing an halolactone of an hydroxytetrahydroabietic acid which comprises treating the dihydroabietic acid, melting at 185°–186° C. and of rotation $(a)_D-36°$, with an halogenating agent at a temperature between about $-35°$ C. and about 60° C.

6. A method for producing an halolactone of an hydroxytetrahydroabietic acid which comprises treating the dihydroabietic acid, melting at 147°–148° C. and of rotation $(a)_D+68°$, with an halogenating agent at a temperature between about $-35°$ C. and about 60° C.

7. As a new composition of matter, a halolactone of hydroxytetrahydroabietic acid.

8. As a new composition of matter, a bromolactone of hydroxytetrahydroabietic acid.

9. As a new composition of matter, a bromolactone of hydroxytetrahydroabietic acid melting at 113°–114° C. and having a rotation $(a)_D$ of 18°.

10. As a new composition of matter, a bromolactone of hydroxytetrahydroabietic acid melting at 100°–101° C. and having a rotation $(a)_D$ of $+4°$.

RICHARD F. B. COX.